(12) United States Patent
Cho

(10) Patent No.: US 6,578,443 B2
(45) Date of Patent: Jun. 17, 2003

(54) SHIFT ROD SUPPORT ASSEMBLY FOR TRANSMISSION GEAR SHIFT MECHANISM

(75) Inventor: Yong-Seok Cho, Cheonlabuk-do (KR)

(73) Assignee: Hyundai Motor Company, Seoul (KR)

( * ) Notice: Subject to any disclaimer, the term of this patent is extended or adjusted under 35 U.S.C. 154(b) by 42 days.

(21) Appl. No.: 09/984,386

(22) Filed: Oct. 30, 2001

(65) Prior Publication Data

US 2002/0051591 A1 May 2, 2002

(30) Foreign Application Priority Data

Oct. 30, 2000 (KR) ........................................ 2000-63977

(51) Int. Cl.[7] .................. B60K 20/00; F16C 29/04
(52) U.S. Cl. .................. 74/473.36; 74/473.1; 384/49; 403/322.2
(58) Field of Search .................. 74/473.36, 473.1, 74/503, 511 R, 569, 586; 248/74.1, 227.4; 384/49; 403/321, 322.1, 322.2

(56) References Cited

U.S. PATENT DOCUMENTS

| 4,315,698 A | * | 2/1982 | Takahashi et al. ............ 403/59 |
| 4,691,585 A | * | 9/1987 | Gottfried .................... 74/473.1 |
| 5,081,885 A | * | 1/1992 | Shaffer ......................... 74/569 |
| 5,494,353 A | * | 2/1996 | Diemer ......................... 384/49 |
| 6,474,868 B2 | * | 11/2002 | Geyer et al. .................. 384/49 |

* cited by examiner

*Primary Examiner*—Richard M. Lorence
*Assistant Examiner*—Eric M Williams
(74) *Attorney, Agent, or Firm*—Birch, Stewart, Kolasch & Birch, LLP

(57) ABSTRACT

Disclosed is a shift rod support assembly for a transmission gear shift mechanism comprising a housing fixed to a vehicle body and including a hole through which a shift rod passes; a ball case including a fixed unit that is fixedly mounted to the housing and has a hole through which the shift rod passes, and having a protrusion portion extending toward an inner area of the housing from the fixed unit and a plurality of ball insertion holes; a plurality of balls, each provided in one of the ball insertion holes in a state of contacting the shift rod, the balls rotating as the shift rod undergoes rectilinear and rotational motion; rollers provided in a space formed by the housing and the ball case, the rollers contacting and rotating together with the balls; and play adjustment members for adjusting play between the rollers and the balls by manipulating positioning of the rollers relative to the housing and the ball case.

10 Claims, 3 Drawing Sheets ured with the shift rod 110 to
SHIFT ROD SUPPORT ASSEMBLY FOR TRANSMISSION GEAR SHIFT MECHANISM

BACKGROUND OF THE INVENTION (a) Field of the Invention

The present invention relates to a shift rod support assembly for a transmission gear shift mechanism, and more particularly, to a shift rod support assembly for a transmission gear shift mechanism in which the adjustment of play between a shift rod and support assembly is easy and resistance during a selecting operation of a shift lever is reduced, thereby resulting in the reduction of noise during operation, and improvement in the overall durability and smooth operation of the transmission gear shift mechanism.

(b) Description of the Related Art

There are a variety of types of transmission gear shift mechanisms for controlling a manual transmission, depending on transmission type and the location of the transmission. The two main categories of transmission gear shift mechanisms are the direct-operation type and the remote-operation type. In the remote-operation type transmission gear shift mechanism, the shift lever and transmission are separated by a substantial distance, and a shift rod or cable connects these two elements to permit interaction therebetween. The shift rod or cable transmits the force applied to the shift lever by the driver to the transmission, which, in the case where the remote-operation type transmission gear shift mechanism is applied, is mounted toward the rear of the vehicle. When the shift rod is used, a support assembly for supporting the shift rod is provided at a suitable location.

A guide-type support assembly is an example of such a shift rod support assembly. The guide-type support assembly includes a plastic bracket mounted at a suitable location of the transmission gear shift rod and to a vehicle body. Also, a cylindrical rubber boot, which prevents the entrance of foreign substances, is provided around an external surface of the bracket along a longitudinal direction of the shift rod. An advantage of the bracket is its low price, but the bracket has a limited durability and is particularly susceptible to wear by rectilinear and rotational motion of the shift rod.

Since it is not possible to minimize such wear, the development of play between the shift rod and support assembly is unavoidable. This results in the generation of noise when driving on an uneven road surface. That is, the motion of the shift rod within the support assembly as a result of the play between these two elements causes the generation of a raffling noise particularly when driving on an uneven road surface. Therefore, roller-type support assemblies are now more commonly used than guide-type support assemblies.

FIG. 1 shows a perspective view of a roller-type support assembly for a transmission gear shift rod.

As shown in the drawing, brackets 112 and 114 are provided at a predetermined location and on opposite sides of a circumference of a shift rod 110. An upper roller 116 and a lower roller 118 are mounted between the brackets 112 and 114 on opposite sides of the shift rod 110 and in contact with the shift rod 110 such that the upper and lower rollers 116 and 118 are substantially perpendicular to a plane made by the brackets 112 and 114. Rubber boots 120 and 122 are mounted around the circumference of the shift rod 110 at predetermined positions. The rubber boots 120 and 122 are cylindrical and in close contact with the shift rod 110. In operation, the upper and lower rollers 116 and 118 rotate during rectilinear motion of the shift rod 110 as shown by the arrows in the drawing. The lower roller 118 is particularly concave where contact is made with the shift rod 110 to enable rotation.

Although the roller-type support assembly produces less noise and is more durable than the guide-type support assembly, because the rollers 116 and 118 rotate only during rectilinear motion of the shift rod 110), rotational motion of the shift rod 110) is not effectively performed (the shift rod 110 typically undergoes rectilinear motion to effect shifting into different gears and rotational motion to effect shifting into different shift ranges). Therefore, more force is needed in manipulating the shift lever when selecting a shift range.

Further, the rollers 116 and 118 wear over time by the rectilinear and rotational motion of the shift rod 110 such that a gap develops between the rollers 116 and 118 and the shift rod 110. This gap causes play between the shift rod 110 and the support assembly, and since it is not possible to remove the developing gap, it is not possible to compensate for the play between these elements.

SUMMARY OF THE INVENTION

The present invention has been made in an effort to solve the above problems.

It is an object of the present invention to provide a shift rod support assembly for a transmission gear shift mechanism, in which the adjustment of play between a shift rod and support assembly is easy and resistance during a rotational operation of a shift lever is reduced, thereby resulting in the reduction of noise during operation and improvement in the overall durability and smooth operation of the transmission gear shift mechanism.

To achieve the above object, the present invention provides a shift rod support assembly for a transmission gear shift mechanism comprising a housing fixed to a vehicle body and including a hole through which the shift rod passes; a ball case including a fixed unit that is fixedly mounted to the housing and has a hole through which the shift rod passes, and a protrusion portion extending toward an inner area of the housing from the fixed unit and having a plurality of ball insertion holes; a plurality of balls, each provided in one of the ball insertion holes in a state whereby they contact the shift rod, the balls rotating as the shift rod undergoes rectilinear and rotational motion; rollers provided in a space formed by the housing and the ball case, the rollers contacting and rotating together with the balls; and play adjustment members for adjusting play between the rollers and the balls by manipulating a positioning of the rollers relative to the housing and the ball case.

According to a feature of the present invention, the play adjustment members comprise inner columns provided within the rollers and about which the rollers are able to rotate; and fixed rods fixedly provided off-center within the inner columns, ends of the fixed rods being fixed to the housing and the ball case.

According to another feature of the present invention, lubrication holes are provided in the inner columns to enable contact surfaces between the inner columns and the rollers to be lubricated.

According to yet another feature of the present invention, at least one of the ends of the fixed rods is threaded such that a nut may be screw-coupled onto the threads, and a center portion of the fixed rods between the ends is rectangular and fits into a corresponding hole provided in the inner columns such that when at least one of the ends of the fixed rods is secured, the inner columns also remain fixed.

According to still yet another feature of the present invention, the housing and the ball case are made of a material such as Teflon or polyethylene, which have exceptional durability and undergo no alteration as a result of contact with grease.

According to still yet another feature of the present invention, grooves are formed on a surface of the balls to minimize a contact surface between the balls and the rollers.

According to still yet another feature of the present invention, the ball case is screw-coupled onto the housing.

According to still yet another feature of the present invention, the balls first contact the shift rod insertion holes before making contact with the shift rod.

According to still yet another feature of the present invention, an insertion portion is formed in an inner face of the housing and an end of the protrusion portion is inserted into the insertion portion.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
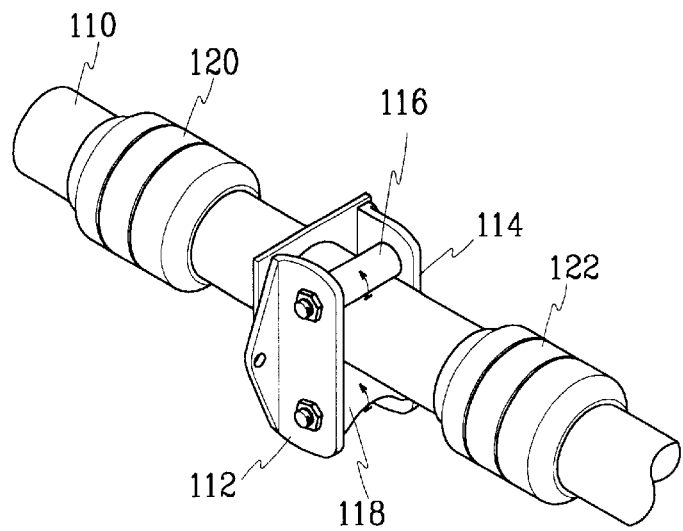
FIG. 1 is a perspective view of a conventional roller-type support assembly for a transmission gear shift rod.
Figure 2:
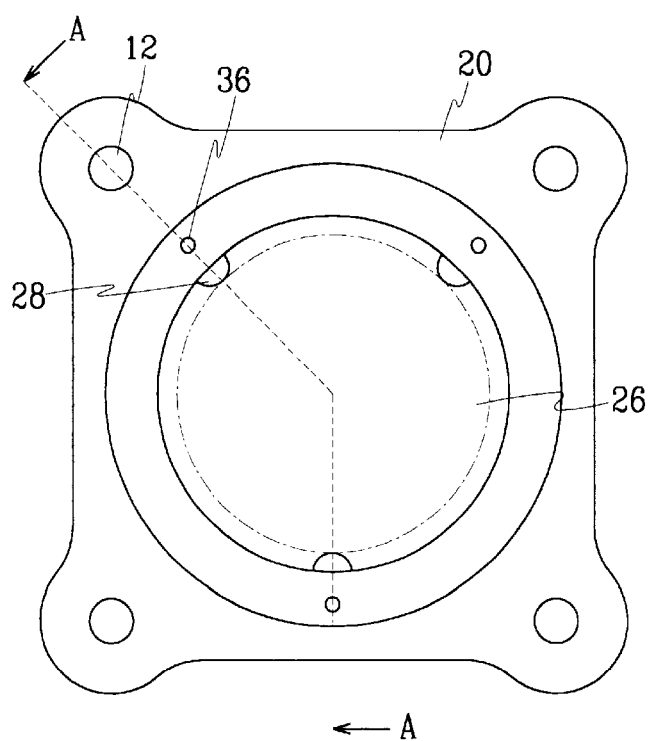
FIG. 2 is a front view of a support assembly for a transmission gear shift rod according to a preferred embodiment of the present invention.
Figure 3:
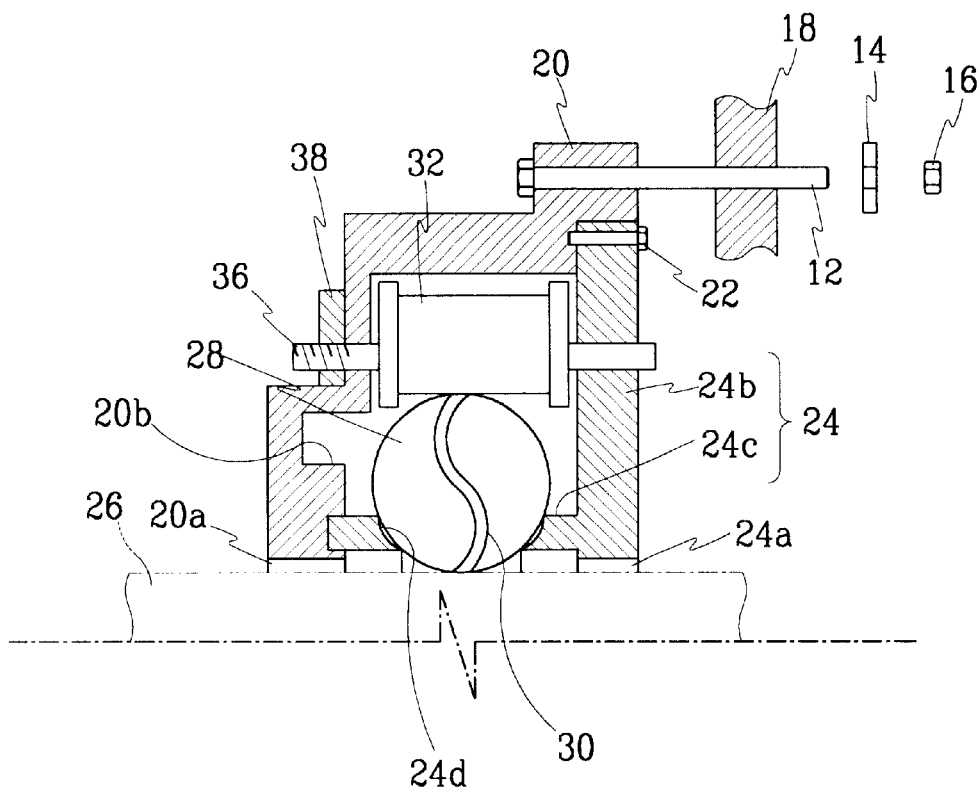
FIG. 3 is a sectional view taken along line A—A of FIG. 2.

FIG. 2 shows a front view of a transmission gearshift rod support assembly according to a preferred embodiment of the present invention, and FIG. 3 is a sectional view taken along line A—A of FIG. 2. Since upper and lower portions of a sectional view of FIG. 2 are symmetrical, only the components of the upper portion of the line A—A are shown in FIG. 3, with the understanding that the omitted lower portion is identical.

A transmission gearshift rod support assembly according to a preferred embodiment of the present invention includes a housing 20, which is fixed to a vehicle body 18 by bolts 12, washers 14 and nuts 16, and a ball case 24 coupled to the housing 20 by screws 22. A shift rod 26 of a transmission gear shift mechanism passes through holes 20a and 24a formed in the housing 20 and the ball case 24, respectively.

The ball case 24 includes a fixed unit 24b fixed to the housing 20 and a protrusion portion 24c extending toward an inner area of the housing 20 from the fixed unit 24b. An insertion portion 20b, into which an end of the protrusion portion 24c is inserted, is provided in an inner face of the housing 20. Also, a plurality of ball insertion holes 24d are formed at equal intervals around the ball case 24 in the protrusion portion 24c, and a ball 28 is provided in each ball insertion hole 24d in a state such that it contacts the shift rod 26. With this configuration, the balls 28 and the protrusion portion 24c form a band-type contact surface that encompasses the shift rod 26.

If the ball insertion holes 24d are formed having a diameter smaller than the balls 28, that is if the above contact surface is more concave than the diameter of the balls 28, since the balls 28 contact the ball insertion holes 24d before making contact with the shift rod 26, friction, rolling resistance, and planar wear can be reduced when the balls 28 rotate as a result of rectilinear and rotational movement of the shift rod 26.

Further, it grooves 30 are formed on an outer surface of the balls 28, a contact area between the shift rod 26 and the balls 28, and between rollers (to be described hereinafter) and the bails 28 is reduced. In FIG. 3, although a single groove 30 is shown, a plurality of grooves 30 may be provided. Also, if the housing 20 and the ball case 24 are made of a material such as Teflon or polyethylene, which have exceptional durability and undergo no alteration as a result of contact with grease, an improvement in durability and reduction in noise are achieved.

Rollers 32 are provided in an inner space formed by the housing 20 and the ball case 24. The rollers 32 contact and rotate together with the balls 28. Also, the positioning of the rollers 32 relative to the housing 20 and the ball case 24 is able to be manipulated such that play between the rollers 32 and the balls 28 can be adjusted. The rollers 32 are provided within the housing 20 and the ball case 24 such that there is a predetermined amount of distance between the housing 20 and the ball case 24 to allow forward and reverse movement of the rollers 32 when the balls 28 rotate.

Figure 4:
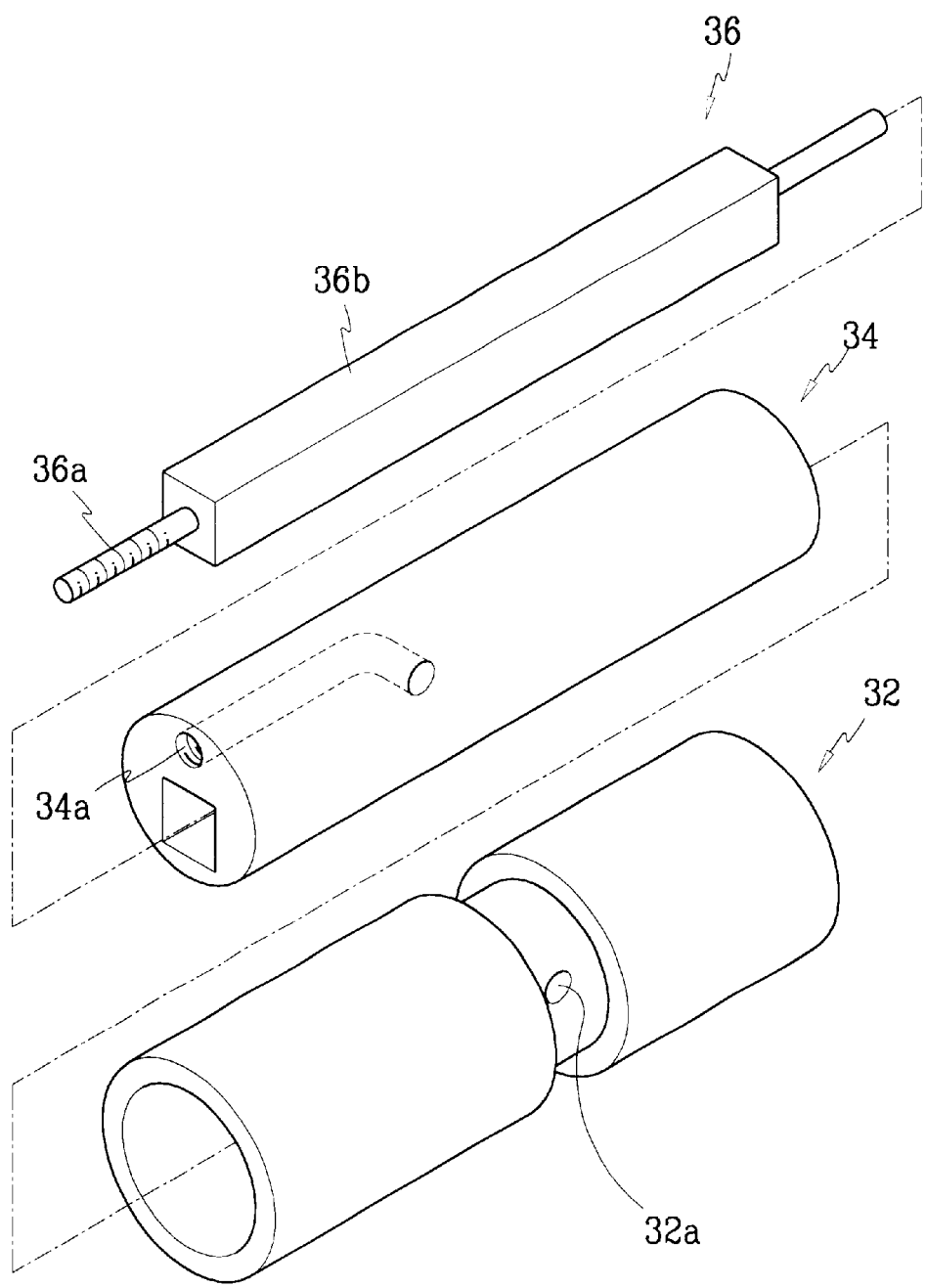
FIG. 4 is an exploded perspective view of a roller of FIG. 2.

An exploded perspective view of one of the rollers 32 appears in FIG. 4. As shown in the drawing, an inner column 34 is provided within the roller 32, and the roller 32 rotates about the inner column 34. A fixed rod 36 is provided within the inner column 34 at a position that is a predetermined distance from a longitudinal axis of the inner column 34. That is, the fixed rod 36 is fixedly provided off-center within the inner column 34.

A center portion 36b of the fixed rod 36 is provided within the inner column 34, and ends of the fixed rod 36 protrude outward from the center portion 36b to be fixed in the housing 20 and the ball case 24. One of the protruding ends of the fixed center 36 is a threaded end 36a, and a nut 38 is screw-coupled onto the threaded end 36a outside the housing 20. The center portion 36b of the fixed rod 36 is rectangular and fits into a corresponding hole provided in the inner column 34.

Accordingly, with the threaded end 36a of the fixed rod 36 secured, the inner column 34 also remains fixed. Both protruding ends of the fixed rod 36 may be threaded and coupled in the same manner as the threaded end 36a. Also, when the shift rod 26 undergoes rectilinear motion, the roller 32 also undergoes rectilinear motion on the inner column 34, and when the shift rod 26 undergoes rotational motion, the roller 32 rotates on the inner column 34.

Figure 5:
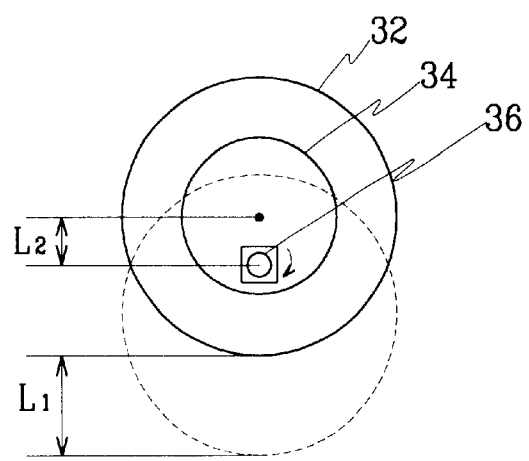
FIG. 5 is a drawing used to describe adjustments in a position of a roller of FIG. 2.

However, by manually rotating the fixed rod 36 to a desired location then securing the same by tightening the nut 38 on the threaded end 36a, play between the roller 32 and the ball 28 can be adjusted. That is, with reference to FIG. 5, by repositioning the inner column 34 by rotating and re-tightening the fixed rod 36, a play adjustment range L1 is provided. The play adjustment range L1 is proportional to a distance between a center axis of the inner column 34 and a center of the hole in the inner column 34.

Lubrication holes 34a and 32a are formed respectively in the roller 32 and the inner column 34. By supplying a lubricant to the lubrication holes 34a and 32a, friction and rolling resistance between the roller 32 and the inner column 34 may be reduced. Accordingly, wear of the roller 32 and the inner column 34 is also reduced.

In the shift rod support assembly for a transmission gear shift mechanism of the present invention described above, the adjustment of play between the rollers and balls (i.e., between the shift rod and the support assembly) is easily performed. Also, the replacement of the parts in the support assembly is easy as a result of its simple structure.

Further, since (a) the balls first contact the ball insertion holes before making contact with the shift rod, (b) grooves are formed in the surface of the balls, and (c) a lubricant is supplied between the inner column and roller, friction, rolling resistance and wear of the balls and rollers are reduced. This also results in the ability to perform shifting with less force applied by the driver.

Finally, by making the housing and the ball case out of a material such as Teflon or polyethylene, the overall durability and ability to withstand property changes as a result of contact with grease of the support assembly are improved. A reduction in noise during operation of the support assembly is also achieved as a result.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A shift rod support assembly for a transmission gear shift mechanism comprising:
    a housing fixed to a vehicle body and including a hole through which a shift rod passes;
    a ball case including a fixed unit that is fixedly mounted to the housing and has a hole through which the shift rod passes, and a protrusion portion extending toward an inner area of the housing from the fixed unit and having a plurality of ball insertion holes;
    a plurality of balls, each provided in one of the ball insertion holes in a state whereby they contact the shift rod, the balls rotating as the shift rod undergoes rectilinear and rotational motion;
    rollers provided in a space formed by the housing and the ball case, the rollers contacting and rotating together with the balls; and
    play adjustment members for adjusting play between the rollers and the balls by manipulating a positioning of the rollers relative to the housing and the ball case.

2. The shift rod support assembly of claim 1 wherein the play adjustment members comprise:
    inner columns provided within the rollers and about which the rollers are able to rotate; and
    fixed rods fixedly provided off-center within the inner columns, ends of the fixed rods being fixed to the housing and the ball case.

3. The shift rod support assembly of claim 2 wherein lubrication holes are provided in the inner columns to enable contact surfaces between the inner columns and the rollers to be lubricated.

4. The shift rod support assembly of claim 2 wherein at least one of the ends of the fixed rods is threaded such that a nut may be screw-coupled onto the threads, and a center portion of the fixed rods between the ends is rectangular and fits into a corresponding hole provided in the inner columns such that when at least one of the ends of the fixed rods is secured, the inner columns also remain fixed.

5. The shift rod support assembly of claim 1 wherein the housing and the ball case are made of a material such as Teflon or polyethylene, which have exceptional durability and undergo no property changes as a result of contact with grease.

6. The shift rod support assembly of claim 1 wherein grooves are formed on a surface of the balls to minimize a contact surface between the balls and the rollers.

7. The shift rod support assembly of claim 1 wherein the ball case is screw-coupled onto the housing.

8. The shift rod support assembly of claim 1 wherein the balls contact the shift rod insertion holes.

9. The shift rod support assembly of claim 1 wherein an insertion portion is formed in an inner face of the housing and an end of the protrusion portion is inserted into the insertion portion.

10. A shift rod support assembly for a transmission gear shift mechanism comprising:
    balls for contacting a shift rod;
    rollers for applying pressure to the balls in a direction toward the shift rod;
    play adjustment members for adjusting a distance between a center axis of the rollers and the balls; and
    a case into which the balls, rollers and the play adjustment members are mounted.

* * * * *